US008675707B2

(12) United States Patent
Kagiwada et al.

(10) Patent No.: US 8,675,707 B2
(45) Date of Patent: Mar. 18, 2014

(54) GAS LASER APPARATUS EQUIPPED WITH POWER CALCULATION UNIT

(75) Inventors: Satoshi Kagiwada, Yamanashi (JP); Yoshitaka Kubo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 41 days.

(21) Appl. No.: 13/531,699

(22) Filed: Jun. 25, 2012

(65) Prior Publication Data

US 2013/0039377 A1    Feb. 14, 2013

(30) Foreign Application Priority Data

Aug. 9, 2011    (JP) .................. 2011-173741

(51) Int. Cl.
*H01S 3/22* (2006.01)

(52) U.S. Cl.
USPC ........................................... 372/57

(58) Field of Classification Search
USPC ........... 372/57, 58; 359/335, 483; 318/400.02
See application file for complete search history.

(56) References Cited

U.S. PATENT DOCUMENTS

| 2007/0047610 | A1* | 3/2007 | Egawa et al. | 372/55 |
| 2009/0116521 | A1 | 5/2009 | Ando et al. | |
| 2010/0072940 | A1 | 3/2010 | Iwashita et al. | |
| 2010/0117568 | A1* | 5/2010 | Iwashita et al. | 318/400.02 |
| 2012/0112671 | A1 | 5/2012 | Yamaguchi et al. | |

FOREIGN PATENT DOCUMENTS

| JP | 2004116920 A | 4/2004 |
| JP | 2005-117754 A | 4/2005 |
| JP | 2005117754 A | 4/2005 |
| JP | 2007059690 A | 3/2007 |
| JP | 2010074918 A | 4/2010 |
| JP | 2010081679 A | 4/2010 |
| JP | 2010115063 A | 5/2010 |
| JP | 2011019333 A | 1/2011 |
| JP | 2011-028372 A | 2/2011 |
| JP | 2011048548 A | 3/2011 |

OTHER PUBLICATIONS

Office Action issued on Oct. 23, 2012 by the Japanese Patent Office in corresponding Japanese Application No. 2011-173741, with English translation.
Office Action for corresponding German Patent Application 10 2012 015 441.0 mailed Sep. 30, 2013.

* cited by examiner

*Primary Examiner* — Jessica Stultz
*Assistant Examiner* — Tuan Nguyen
(74) *Attorney, Agent, or Firm* — Lowe Hauptman & Ham, LLP

(57) ABSTRACT

Disclosed is a gas laser apparatus having: a first estimation unit which calculates an estimate of input power to the laser power supply device by using the output current value and output voltage value of the DC power supply unit and also using the efficiency of conversion from input power to output power by the DC power supply unit; a second estimation unit which calculates an estimate of input power to the driving device by using the output current value of the driving device; and a power calculation unit which calculates the power consumption value of the gas laser apparatus, based on the estimate of the input power to the laser power supply device and the estimate of the input power to the driving device.

6 Claims, 2 Drawing Sheets

GAS LASER APPARATUS EQUIPPED WITH POWER CALCULATION UNIT

RELATED APPLICATIONS

The present application is based on, and claims priority from, Japanese Application Number 2011-173741, filed Aug. 9, 2011, the disclosure of which is hereby incorporated by reference herein in its entirety.

BACKGROUND OF THE INVENTION

1. Field of the Invention

The present invention relates to a gas laser apparatus having a laser power supply device for exciting a laser gas in a discharge tube by producing an electric discharge therein and a blower for supplying a laser gas into the discharge tube, and more particularly to a gas laser apparatus equipped with a power calculation unit for calculating power consumed during operation.

2. Description of the Related Art

Today, there is an increasing need to reduce energy consumption in various technical fields. The field of gas laser apparatus is no exception, and the need to reduce power consumption during operation as much as possible has also been increasing in this field. In a gas laser apparatus, a laser gas is supplied into a discharge tube, and laser light is produced by exciting the laser gas in an electric discharge produced by applying a radio-frequency voltage between the electrodes inside the discharge tube. For this purpose, the gas laser apparatus incorporates in its power supply system a laser power supply device for exciting the laser gas in the discharge tube by producing an electric discharge therein and a driving device for driving a blower for supplying the laser gas into the discharge tube.

To measure the power consumption of such a gas laser apparatus, providing a power meter on the three-phase power input side of the gas laser apparatus has been proposed, as disclosed in Japanese Unexamined Patent Publication No. 2011-028372.

On the other hand, while an inverter control method is generally employed to drive the motor of the blower inside the gas laser apparatus, as a method for measuring the power consumption of a motor in general, including but not limited to a blower motor, a method that calculates the power consumption value of the motor by using the current value and voltage value respectively detected by a current detection circuit and voltage detection circuit provided on the three-phase power input side of the motor has been proposed, as disclosed in Japanese Unexamined Patent Publication No. 2010-074918.

There a control apparatus for calculating power consumption in an industrial machine having a mechanical device driven by a motor has also been proposed, as disclosed in Japanese Unexamined Patent Publication No. 2010-115063. According to this method, the power consumption of the motor is estimated through calculation by using a motor current detection unit for detecting the current flowing in the motor in conjunction with a motor rotational speed detection unit for detecting the rotational speed of the motor.

On the other hand, a method for calculating the power consumption of a power supply device by estimation from an output power value by using the output power versus conversion efficiency characteristics prestored in a storage unit has been proposed.

As described above, one possible method for measuring the power consumption of a gas laser apparatus is to install a power meter, but this method is costly and laborious. For example, according to the techniques disclosed in above-cited Japanese Unexamined Patent Publication Nos. 2011-028372 and 2010-074918, a current transformer (CT) or a power meter or the like has to be installed on a cable through which power is supplied to the gas laser apparatus.

On the other hand, if the technique disclosed in above-cited Japanese Unexamined Patent Publication No. 2010-115063 is applied to calculate the power consumption of a gas laser apparatus, it may be possible to calculate the power consumption of the blower motor by suitably combining the motor current detection unit and the motor rotational speed detection unit, but when measuring the power consumption of the gas laser apparatus, it is difficult to accurately measure it because the discharge load impedance of the discharge tube varies widely depending on the magnitude of the output of the gas laser apparatus. The technique disclosed in Japanese Unexamined Patent Publication No. 2010-115063 is therefore not suitable for measuring the overall power consumption of the gas laser apparatus.

The technique disclosed in above-cited Japanese Unexamined Patent Publication No. 2011-048548, on the other hand, requires detailed data of the output power versus conversion efficiency characteristics in order to accurately calculate the power consumption, and the capacity of the storage unit for storing the data will be enormous. The amount of computation will also be enormous.

SUMMARY OF THE INVENTION

In view of the above problems, it is an object of the present invention to provide a gas laser apparatus that enables its power consumption in operation to be measured accurately and easily.

To achieve the above object, the present invention provides a gas laser apparatus including: a laser power supply device having a DC power supply unit for converting input AC power into DC power and an RF power supply unit for converting the DC power, output from the DC power supply unit, into a radio-frequency voltage which is applied to produce an electric discharge for exciting a laser gas contained in a discharge tube; and a driving device which converts input AC power into AC power for driving a blower to supply the laser gas into the discharge tube, wherein the gas laser apparatus includes: a first estimation unit which calculates an estimate of input power to the laser power supply device by using an output current value and an output voltage value detected from the DC power supply unit and also using a DC power supply conversion efficiency which represents the efficiency of conversion from input power to output power by the DC power supply unit; a second estimation unit which calculates an estimate of input power to the driving device by using an output current value detected from the driving device; and a power calculation unit which calculates a power consumption value of the gas laser apparatus, based on the estimate of the input power to the laser power supply device and the estimate of the input power to the driving device.

The first estimation unit calculates the estimate of the input power to the laser power supply device by setting the DC power supply conversion efficiency to a value calculated in accordance with a logarithmic function whose variable is an output power value calculated by multiplying together the output current value and the output voltage value of the DC power supply unit, when the laser gas inside the discharge tube is discharge-excited, and to a given constant value when the laser gas inside the discharge tube is not discharge-excited.

Further, the first estimation unit 11 calculates the estimate of the input power to the laser power supply device, based on a value obtained by dividing the output power value of the DC power supply unit by the DC power supply conversion efficiency and on a standby power value of the laser power supply device.

When the blower is in an acceleration operation or constant-speed operation mode, the second estimation unit calculates the estimate of the input power to the driving device by dividing the value of input power to the blower by a driving device conversion efficiency which represents the efficiency of conversion from input power to output power by the driving device, wherein the value of the input power to the blower is calculated in accordance with a quadratic function whose variable is the output current value of the driving device.

On the other hand, when the blower is in a deceleration operation mode, the second estimation unit calculates the estimate of the input power to the driving device in accordance with a cubic function whose variable is the time elapsed from the initiation of deceleration of the blower.

The power calculation unit may calculate the power consumption value of the gas laser apparatus, based on a premeasured power consumption value of a laser gas exhaust pump provided in the gas laser apparatus and on the estimate of the input power to the laser power supply device and the estimate of the input power to the driving device.

BRIEF DESCRIPTION OF THE DRAWINGS

The present invention will be more clearly understood with reference to the following accompanying drawings.

DETAILED DESCRIPTION

A gas laser apparatus equipped with a power calculation unit will be described below with reference to the drawings. It should, however, be understood that the present invention is not limited to the accompanying drawings, nor is it limited to the particular embodiment described herein.

Figure 1:
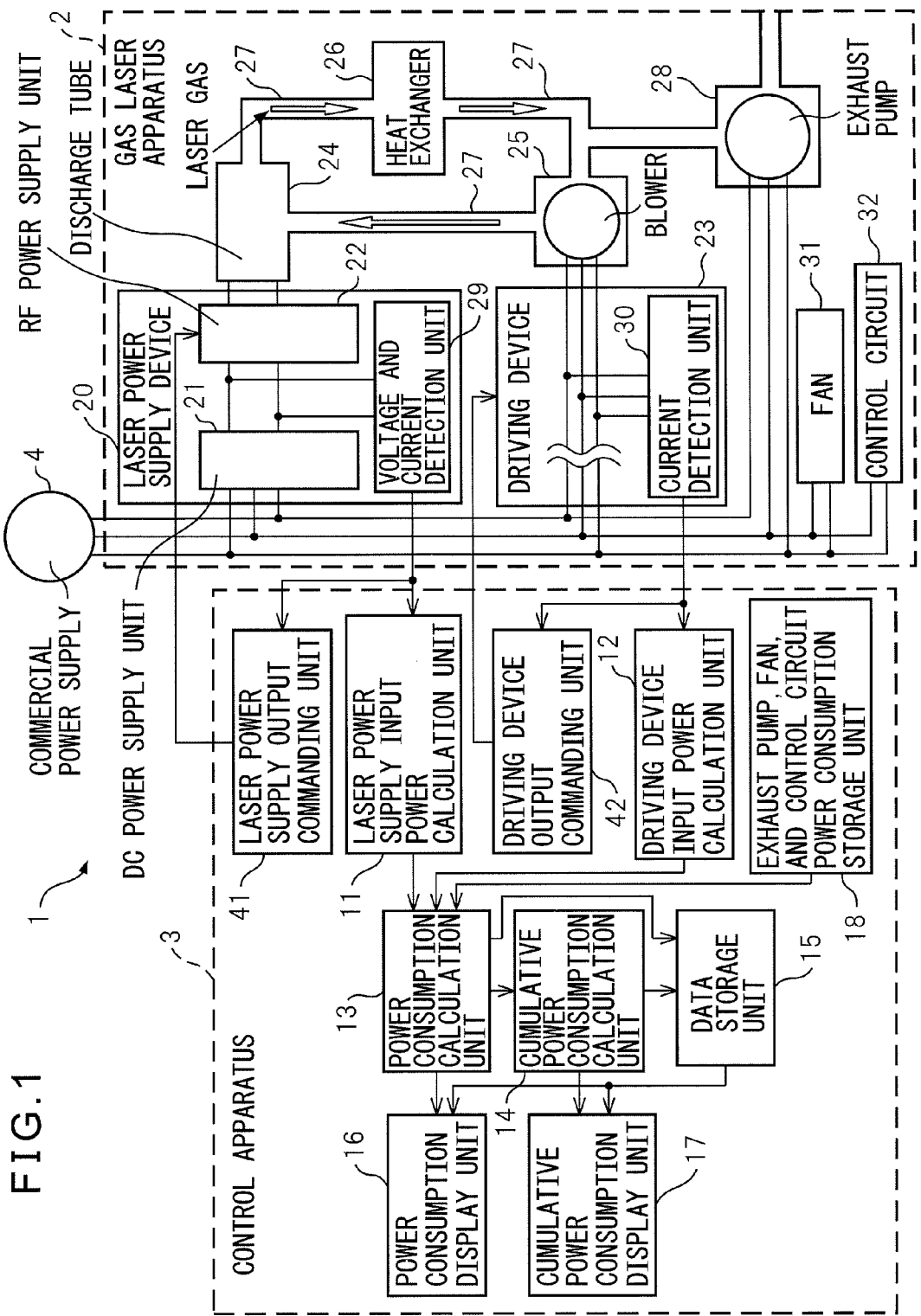
FIG. 1 is a block diagram showing a gas laser apparatus according to an embodiment of the present invention.

FIG. 1 is a block diagram showing the gas laser apparatus according to the embodiment of the present invention. The gas laser apparatus 1 according to the embodiment of the present invention includes, in addition to the gas laser apparatus proper 2, a control apparatus 3 which controls the overall operation of the gas laser apparatus 2.

The gas laser apparatus proper 2 includes a discharge tube 24, a laser power supply device 20 which generates a radio-frequency voltage for exciting a laser gas in the discharge tube 24 by producing an electric discharge therein, a blower 25 for supplying the laser gas into the discharge tube 24, a driving device 23 for driving the blower 25, a heat exchanger 26 for cooling the laser gas, a fan 31 for cooling the interior of the laser apparatus, and a control circuit 32 for controlling the laser apparatus. The discharge tube 24, the heat exchanger 26, and the blower 25 are interconnected by ducts 27, and the laser gas is caused to flow through the ducts 27 by the blower 25 and is cooled while passing through the heat exchanger 26. An exhaust pump 28 is provided to exhaust the laser gas flowing through the ducts 27.

The discharge tube 24 contains discharge electrodes, and laser light is produced by exciting the laser gas in an electric discharge produced by applying a radio-frequency voltage between the discharge electrodes inside the discharge tube 24. When the gas laser apparatus 1 is, for example, a $CO_2$ laser oscillator, a gas mixture, such as "He+$N_2$+$CO_2$", "He+$N_2$+$CO_2$+CO", "He+$N_2$+$CO_2$+$H_2$", "He+$N_2$+$CO_2$+CO+$H_2$" or "He+$N_2$+$CO_2$+$H_2$+Xe", may be used as the laser gas.

The laser power supply device 20 receives AC power from a commercial power supply 4 and converts the input AC power into a radio-frequency voltage which is applied between the discharge electrodes to produce an electric discharge for exciting the laser gas contained in the discharge tube 24. Usually, the laser power supply device 20 includes a DC power supply unit 21 for converting the input AC power into DC power for output and an RF power supply unit 22 for converting the DC power, output from the DC power supply unit 21, into the radio-frequency voltage which is applied to produce an electric discharge for exciting the laser gas contained in the discharge tube 24. A voltage and current detection unit 29 is provided to detect the output current value and output voltage value of the DC power supply unit 21. The output current value and output voltage value of the DC power supply unit 21, detected by the voltage and current detection unit 29, are supplied to a laser power supply output commanding unit 41 provided in the control apparatus 3, and the laser power supply output commanding unit 41 controls the generation of the laser light by controlling, based on the supplied values, the radio-frequency voltage that the RF power supply unit 22 outputs.

The driving device 23 receives AC power from the commercial power supply 4 and converts the input AC power into AC power for driving the blower 25. The motor of the blower 25 is driven, for example, by using inverter control. In the case of inverter control, the driving device 23 includes a converter (rectifier) for converting the AC power, received from the commercial power supply 4, into DC power and an inverter for converting the DC power back to the AC power. A current detection unit 30 is provided to detect the output current value of the driving device 23 in order to control the blower 25 which is driven by the AC power output from the driving device 23. The output current value of the driving device 23, detected by the current detection unit 30, is supplied to a driving device output commanding unit 42 provided in the control apparatus 3, and the driving device output commanding unit 42 controls the driving of the blower 25 by controlling the AC output of the driving device 23 based on the supplied value.

As described above, in the control apparatus 3 that controls the overall operation of the gas laser apparatus proper 2, the laser power supply output commanding unit 41 controls the radio-frequency voltage that the RF power supply unit 22 outputs to excite the laser gas by an electric discharge, and the driving device output commanding unit 42 controls the AC output of the driving device 23 to drive the blower so as to circulate and cool the laser gas, the control apparatus 3 thus performing control so that the desired laser light can be generated by the discharge tube 24. To achieve these control operations, the voltage and current detection unit 29 and the current detection unit 30 are provided in the gas laser apparatus proper 2. In the gas laser apparatus 1 according to the embodiment of the present invention, the power consumption of the gas laser apparatus 1 is calculated, as will be described below, by using the output current value and output voltage value detected by the voltage and current detection unit 29 to control the generation of the laser light and the output current value detected by the current detection unit 30 to control the driving of the blower 25.

The gas laser apparatus 1 according to the embodiment of the present invention includes, in the control apparatus 3, a laser power supply input power calculation unit 11 as a first estimation unit which calculates an estimate of the input power to the laser power supply device, a driving device input power calculation unit 12 as a second estimation unit which calculates an estimate of the input power to the driving device, and a power consumption calculation unit 13 as a power calculation unit which calculates the power consumption value of the gas laser apparatus 1 by using the results of the calculations made by the laser power supply input power calculation unit 11 and the driving device input power calculation unit 12. In this way, the embodiment of the present invention includes two estimation units, i.e., the laser power supply input power calculation unit 11 and the driving device input power calculation unit 12. The gas laser apparatus 1 also includes, in the control apparatus 3, an exhaust pump, fan, and control circuit power consumption storage unit 18 in which the operating power consumption values measured in advance on the exhaust pump 28, the fan 31, and the control circuit 32, respectively, are stored as fixed values. The details will be described later.

The control apparatus 3 in the gas laser apparatus 1 may further include a cumulative power consumption calculation unit 14 which adds up the power consumption calculated by the power consumption calculation unit 13, and a data storage unit 15 which stores the results of the calculations made by the power consumption calculation unit 13 and the cumulative power consumption calculation unit 14. The data obtained from the power consumption calculation unit 13 and the data storage unit 15 may be visually displayed on a power consumption display unit 16; likewise, the data obtained from the cumulative power consumption calculation unit 14 and the data storage unit 15 may be visually displayed on a cumulative power consumption display unit 17.

The laser power supply input power calculation unit 11, driving device input power calculation unit 12, power consumption calculation unit 13, and cumulative power consumption calculation unit 14, described above, may be implemented on the same operational processor on which the laser power supply commanding unit 41 and the driving device commanding unit 42 are also implemented, or may be implemented on a separate operational processor.

The data storage unit 15 and the exhaust pump, fan, and control circuit power consumption storage unit 18 can each be implemented by allocating a memory area from a storage device provided, for example, within the control apparatus 3. Further, the power consumption display unit 16 and the cumulative power consumption display unit 17 may be implemented as the same display unit or as separate display units. Alternatively, provisions may be made so that the data can be displayed on a display unit externally connected to the control apparatus 3 or to the gas laser apparatus 1.

Next, the operations of the laser power supply input power calculation unit 11, the driving device input power calculation unit 12, and the power consumption calculation unit 13, respectively, will be described in further detail below.

The laser power supply input power calculation unit 11 calculates an estimate of the input power to the laser power supply device 20 by using the output current value and output voltage value of the DC power supply unit 21 and also using the DC power supply conversion efficiency, i.e., the input-power-to-output-power conversion efficiency of the DC power supply unit 21. The output current value and output voltage value of the DC power supply unit 21, previously detected by the voltage and current detection unit 29 and used for the laser light generation control, are also used here.

The DC power supply conversion efficiency, i.e., the input-power-to-output-power conversion efficiency of the DC power supply unit 21, is a measure of how much output power the DC power supply unit 21 produces by converting the input power, and is expressed as the ratio of the output power to the input power. Since the input power to the DC power supply unit 21 is identical with the input power to the laser power supply device 20, if the output power value of the DC power supply unit 21 is known, the value of the input power to the DC power supply unit 21, i.e., the value of the input power to the laser power supply device 20, can be estimated using the DC power supply conversion efficiency. The laser power supply device 20 converts the input power into the power used to produce an electric discharge in the discharge tube 24 for excitation; since the laser power supply device 20 also contains the losses due to switching devices and the power consumption of the fan, it follows that if the input power to the laser power supply device 20 can be estimated, the power consumed by the discharge tube 24 and the power consumed by the laser power supply device 20 itself can also be calculated.

Generally, the input-power-to-output-power conversion efficiency of the DC power supply unit 21 contained in the laser power supply device 20 has the characteristic that the efficiency is low when the output power is small, and increases as the output power increases, and the characteristic that the efficiency greatly differs depending on whether the laser gas inside the discharge tube is discharge-excited or not. In view of this, in the embodiment of the present invention, the DC power supply conversion efficiency used to calculate the estimate of the input power to the laser power supply device 20 is set differently, depending on whether the laser gas inside the discharge tube is discharge-excited or not. More specifically, when the laser gas inside the discharge tube is discharge-excited, the DC power supply conversion efficiency is set to a value calculated in accordance with a logarithmic function whose variable is the output power value calculated by multiplying together the output current value and output voltage value of the DC power supply unit 21, and when the laser gas inside the discharge tube is not discharge-excited, it is set at a given constant value. Since whether the laser gas inside the discharge tube is discharge-excited or not is controlled by the output command signal from the laser power supply output commanding unit 41 provided in the control apparatus 3, the laser power supply input power calculation unit 11 determines which DC power supply conversion efficiency is to be used for the calculation by referring to the output command signal output from the laser power supply output commanding unit 41.

Figure 2:
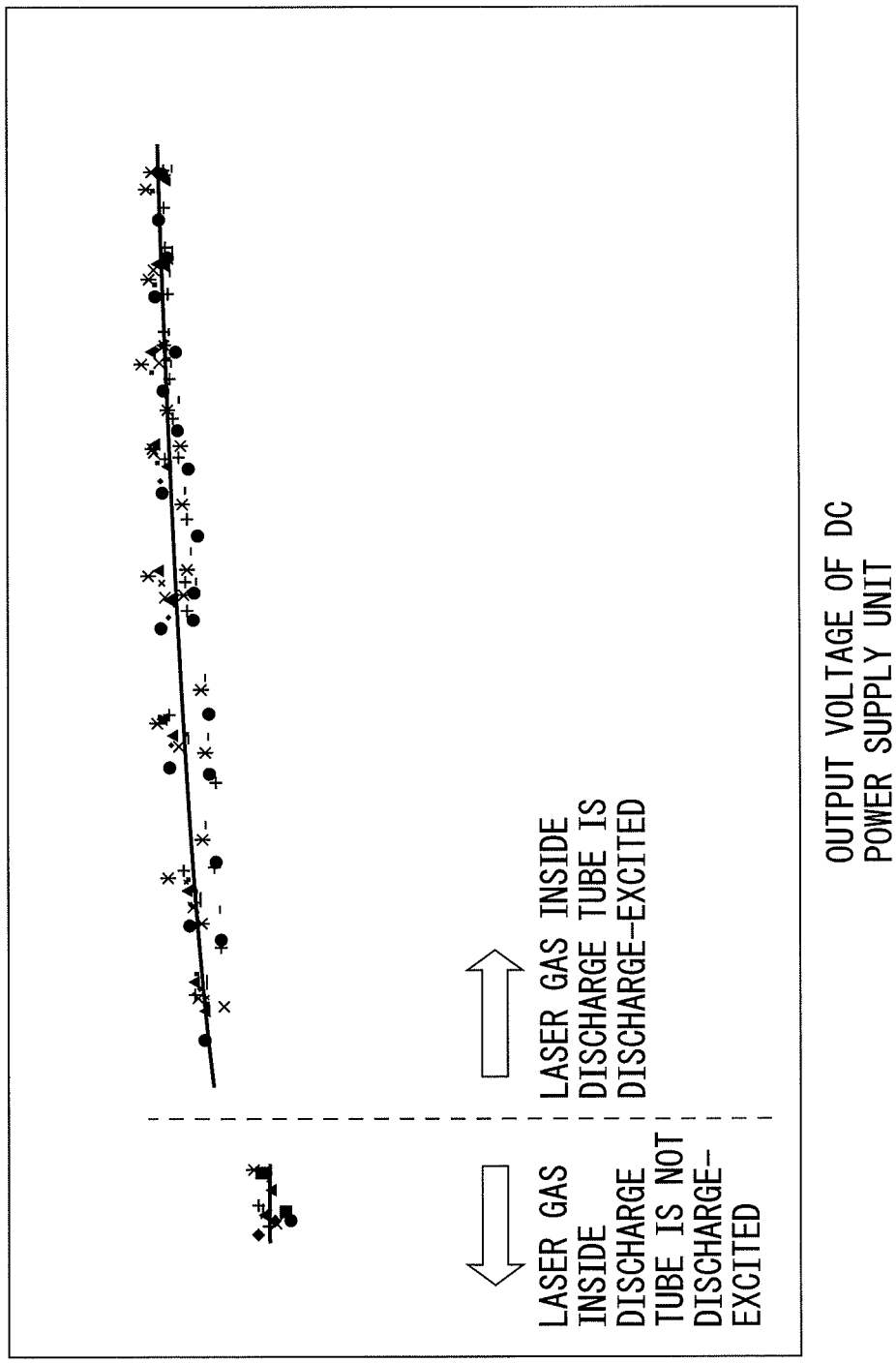
FIG. 2 is a diagram showing one example of the relationship between the output power of a DC power supply unit contained in a laser power supply device and the conversion efficiency of the DC power supply unit, as obtained through experiment.

FIG. 2 is a diagram showing one example of the relationship between the output power of the DC power supply unit contained in the laser power supply device and the conversion efficiency of the DC power supply unit, as obtained through experiment. The applicant verified through experiment that when the laser gas inside the discharge tube is discharge-excited, the DC power conversion efficiency (the ratio of the output power to the input power) of the DC power supply unit 21 contained in the laser power supply device 20 can be approximated to the logarithmic function whose variable is the output power of the DC power supply unit 21, while on the other hand, when the laser gas inside the discharge tube is not discharge-excited, it can be approximated to a given constant value. More specifically, the output power of the DC power supply unit 21 is approximately equal to the input power to the RF power supply unit 22 but, as illustrated in FIG. 2, when the output power of the DC power supply unit 21 is not smaller than the level with which the RF power supply unit 22 can output the radio-frequency voltage/current for discharge-exciting the laser gas in the discharge tube, the DC power supply conversion efficiency (the ratio of the output power to the input power) substantially follows the logarithmic function whose variable is the output power of the DC power supply unit 21. On the other hand, when the output power of the DC power supply unit 21 is smaller than the level with which the RF power supply unit 22 can output the radio-frequency voltage/current for discharge-exciting the laser gas in the discharge tube, the DC power supply conversion efficiency (the ratio of the output power to the input power) is substantially equal to a constant value.

To summarize, the DC power supply conversion efficiency when the laser gas inside the discharge tube is discharge-excited is defined by the logarithmic function expressed by equation 1 below. Here, $\eta_{PSUON}$ is the DC power supply conversion efficiency when the laser gas inside the discharge tube is discharge-excited, $W_{DC}$ is the output power of the DC power supply unit 21, and $C_{PSU1}$ and $C_{PSU2}$ are coefficients.

$$\eta_{PSUON} = C_{PSU1} \times \ln(W_{DC}) + C_{PSU2} \qquad (1)$$

In equation 1, the constants $C_{PSU1}$ and $C_{PSU2}$ vary depending on how the DC power supply unit 21 is configured; therefore, the input power and output power of the DC power supply unit 21 are measured in advance by actually operating the gas laser apparatus 1, and the constants $C_{PSU1}$ and $C_{PSU2}$ are derived by using the measured results.

The estimate of the input power to the laser power supply device 20 when the laser gas inside the discharge tube is discharge-excited is given by equation 2 below. Here, $W_{BEAMON}$ is the estimate of the input power to the laser power supply device 20 when the laser gas inside the discharge tube is discharge-excited, and $W_{STANDBY}$ is the standby power of the laser power supply device 20.

$$W_{BEAMON} = W_{DC}/\eta_{PSUON} + W_{STANDBY} \qquad (2)$$

The standby power $W_{STANDBY}$ of the laser power supply device 20 represents the latent power consumption of the laser power supply device 20, such as the power consumption of switching devices, that occurs when the DC power supply unit 21 is not operating. The DC power supply conversion efficiency when the laser gas inside the discharge tube is discharge-excited, as given by the equation 1 defined by the derived constants $C_{PSU1}$ and $C_{PSU2}$, and the equation 2 for estimating the input power to the laser power supply device 20 by using the DC power supply conversion efficiency are programmed in advance into the operational processor as a program for operating the laser supply input power calculation unit 11.

On the other hand, the DC power supply conversion efficiency when the laser gas inside the discharge tube is not discharge-excited is defined by a given constant value. Let $\eta_{PSUOFF}$ denote the DC power supply conversion efficiency when the laser gas inside the discharge tube is not discharge-excited, $W_{DC}$ the output power of the DC power supply unit 21, $W_{BEAMOFF}$ the estimate of the input power to the laser power supply device 20 when the laser gas inside the discharge tube is not discharge-excited, and $W_{STANDBY}$ the standby power of the laser power supply device 20; then, the estimate, $W_{BEAMOFF}$, of the input power to the laser power supply device 20 when the laser gas inside the discharge tube is not discharge-excited is given by equation 3 below.

$$W_{BEAMOFF} = W_{DC}/\eta_{PSUON} + W_{STANDBY} \qquad (3)$$

In equation 3, the DC power supply conversion efficiency, $\eta_{PSUOFF}$, when the laser gas inside the discharge tube is not discharge-excited varies depending on how the DC power supply unit 21 is configured; therefore, the input power and output power of the DC power supply unit 21 are measured in advance by actually operating the gas laser apparatus 1, and the DC power supply conversion efficiency, $\eta_{PSUOFF}$, is derived by using the measured results. The thus derived DC power supply conversion efficiency, $\eta_{PSUOFF}$, and equation 3 for estimating the input power to the laser power supply device 20 by using the DC power supply conversion efficiency are programmed in advance into the operational processor as a program for operating the laser power supply input power calculation unit 11.

The driving device input power calculation unit 12 calculates an estimate of the input power to the driving device 23. The output power from the driving device 23 is identical with the input power to the blower 25. While the driving device 23 is one that converts its input power into the power used to drive the blower 25, the driving device 23 itself also contains the losses due to switching devices and the power consumption of the fan. It therefore follows that if the input power to the driving device 23 can be estimated, the power consumed by the blower 25 and the power consumed by the driving device 23 itself can also be calculated. In the embodiment of the present invention, the equation that the driving device input power calculation unit 12 uses to calculate the estimate of the input power to the driving device 23 differs between the case where the blower 25 is in an acceleration or constant-speed operation mode and the case where the blower 25 is in a deceleration operation mode.

First, when the blower 25 is in the acceleration or constant-speed operation mode, the driving device input power calculation unit 12 calculates the estimate of the input power to the driving device 23 by dividing the value of the input power to the blower 25 by the driving device conversion efficiency, where the value of the input power to the blower 25 is calculated in accordance with a quadratic function whose variable is the output current value of the driving device 23. The driving device conversion efficiency, which represents the input-power-to-output-power conversion efficiency of the driving device 23, is a measure of how much output power the driving device 23 produces by converting the input power and is expressed as the ratio of the output power to the input power. The output current value of the driving device 23, previously detected by the current detection unit 30 to control the driving of the blower 25, is also used here.

When the blower 25 is in the acceleration or constant-speed control mode, the input power to the blower 25 is obtained using a quadratic function, expressed by equation 4 below, whose variable is the output current value of the driving device 23 which is identical with the input current value of the blower 25. By thus taking the output current value of the driving device 23 as the variable, the estimate of the input power from the driving device 23 can be calculated with good accuracy, irrespective of variations in discharge load. In equation 4, $W_{BRO}$ is the input power value of the blower 25 (i.e., the output power value of the driving device 23), $I_{BRO}$ is the input current value of the blower 25 (that is, the output current value of the driving device 23), and $C_{INV1}$, $C_{INV2}$, and $C_{INV3}$ are coefficients.

$$W_{BRO} = C_{INV1}/I_{INV}^2 + C_{INV2} \times I_{INV} + C_{IVN3} \qquad (4)$$

In equation 4, the constants $C_{INV1}$, $C_{INV2}$, and $C_{INV3}$ vary depending on how the driving device 23 is configured; therefore, the input power and output power of the driving device 23 are measured in advance by actually operating the gas laser apparatus 1, and the constants $C_{INV1}$, $C_{INV2}$, and $C_{INV3}$ are derived by using the measured results.

The estimate of the input power to the driving device 23 when the blower 25 is in the acceleration or constant-speed control mode is given by equation 5 below. Here, $W_{INV}$ is the estimate of the input power to the driving device 23 when the blower 25 is in the acceleration or constant-speed control mode, and $\eta_{INV}$ is the driving device conversion efficiency.

$$W_{INV} = W_{BRO}/\eta_{INV} \quad (5)$$

The driving device conversion efficiency when the blower is in the acceleration or constant-speed control mode, as given by the equation 5 defined by the derived constants $C_{INV1}$, $C_{INV2}$, and $C_{INV3}$, and the equation 5 for estimating the input power to the driving device 23 by using the driving device conversion efficiency are programmed in advance into the operational processor as a program for operating the driving device input power calculation unit 12.

On the other hand, when the blower 25 is in the deceleration control mode, since regenerative power occurs from the motor of the blower 25, it is not possible to apply the equation 5 for the calculation of the estimate of the input power to the driving device 23. Therefore, in the embodiment of the present invention, when the blower 25 is in the deceleration mode, the driving device input power calculation unit 12 calculates the estimate of the input power to the driving device 23 in accordance with a cubic function, expressed by equation 6 below, whose variable is the time elapsed from the initiation of deceleration of the blower 25. Here, $W_{INV}$ is the estimate of the input power to the driving device 23 when the blower 25 is in the deceleration control mode, t is the time elapsed from the initiation of deceleration of the blower 25, and $W_{ini}$ is the estimate of the input current to the driving device 23 just before the initiation of deceleration of the blower 25. That is, $W_{ini}$ represents the estimate of the input current to the driving device 23 that was calculated in accordance with the equation 5 just before the initiation of deceleration of the blower 25. On the other hand, $C_{INV4}$, $C_{INV5}$ and $C_{INV6}$ are coefficients.

$$W_{INV} = C_{INV4} \times t^3 C_{INV5} \times t^2 + C_{INV6} \times t + 1) \times W_{ini} \quad (6)$$

In equation 6, the constants $C_{INV4}$, $C_{INV5}$, and $C_{INV6}$ vary depending on how the driving device 23 is configured; therefore, the input power and output power of the driving device 23 are measured in advance by actually operating the gas laser apparatus 1, and the constants $C_{INV4}$, $C_{INV5}$, and $C_{INV6}$ are derived by using the measured results. Equation 6 defined by the thus derived constants $C_{INV4}$, $C_{INV5}$, and $C_{INV6}$ and used for estimating the input power to the driving device 23 during deceleration control of the blower is programmed in advance into the operational processor as a program for operating the driving device input power calculation unit 12.

The reason that the cubic function expressed by the equation 6, whose variable is the time elapsed from the initiation of deceleration of the blower 25, is used for estimating the input power to the driving device 23 during deceleration control of the blower 25 is that, as a result of the experiment conducted by the applicant to measure the consumption power during the deceleration of the motor of the blower 25, it was verified that the tendency for the power consumption of the blower 25 to decrease with the generation of the regenerative power can be approximated to the cubic function whose variable is the time elapsed from the initiation of deceleration of the blower 25. However, if it can be empirically verified that the tendency can be approximated to some other function than the cubic function, then the other function may be used for the calculation of the estimate of the input power to the driving device 23.

As has been described above, in the embodiment of the present invention, the equation used to calculate the estimate of the input power to the driving device 23 differs between the case where the blower 25 is in the acceleration or constant-speed control mode and the case where the blower 25 is in the deceleration control mode. Since the input power to the blower 25 (i.e., the output power of the driving device 23) is controlled by the driving device output commanding unit 42 provided in the control apparatus 3, the driving device input power calculation unit 12 can determine, based on the output command signal from the driving device output commanding unit 42, whether the blower is in the acceleration or constant-speed control mode or in the deceleration control mode. Based on the result of the determination, the driving device input power calculation unit 12 determines which of the equations is to be used for calculating the estimate of the input power to the driving device 23.

The power consumption calculation unit 13 calculates the power consumption value of the gas laser apparatus 1 by using the sum of the estimate of the input power to the laser power supply device 20, calculated by the laser power supply input power calculation unit 11, and the estimate of the input power to the driving device 23, calculated by the driving device input power calculation unit 12. As noted, earlier the input power to the laser power supply device 20 is identical with the power consumed by the discharge tube 24 and the power consumed by the laser power supply device 20, and the input power to the driving device 23 is identical with the power consumed by the blower 25 and the power consumed by the driving device 23 itself; therefore, by adding together the estimates of these input powers, the power consumption value of the gas laser apparatus 1 can be calculated. Since the equations used to calculate the estimates of these input powers differ depending on whether the laser gas is discharge-excited or not or on whether the blower 25 is in the acceleration or constant-speed control mode or in the deceleration control mode, as has been described above, estimates close to the actual input power values can be calculated with good accuracy, and therefore, the power consumption value of the gas laser apparatus 1 as the sum of the estimates of these input powers can also be accurately calculated.

The power consumed in the gas laser apparatus 1 includes, in addition to those described above, the power consumed by the exhaust pump 28, fan 31, control circuit 32, etc. Therefore, to enhance the calculation accuracy of the power consumption value of the gas laser apparatus 1, the power consumption values of the laser gas exhaust pump 28, fan 31, and control circuit 32 provided in the gas laser apparatus proper 2 may also be added to the sum of the estimate of the input power to the laser power supply device 20, calculated by the laser power supply input power calculation unit 11, and the estimate of the input power to the driving device 23, calculated by the driving device input power calculation unit 12. Since the power consumption of the exhaust pump 28, fan 31, and control circuit 32 is substantially constant irrespectively of the operating state of the gas laser apparatus 1, the power consumption values of the laser gas exhaust pump 28, the fan 31, and the control circuit 32, respectively, may be measured in advance and stored as fixed values in the exhaust pump, fan, and control circuit power consumption storage unit 18. When calculating the power consumption, the power consumption calculation unit 13 may retrieve the stored data from the exhaust pump, fan, and control circuit power consumption storage unit 18 and use them for the calculation. Furthermore, not only the power consumption of the laser gas exhaust pump 28, fan 31, and control circuit 32 described above, but the power consumption of any other device or circuit provided in the gas laser apparatus 1 may also be added in order to further enhance the calculation accuracy of the overall power consumption of the gas laser apparatus 1.

As described above, according to the embodiment of the present invention, since the output current value and output voltage value detected by the voltage and current detection unit 29 already provided for use in controlling the laser light generation and the output current value detected by the current detection unit 30 already provided for use in controlling the driving of the blower 25 are also used when calculating the power consumption of the gas laser apparatus 1, there is no need to provide any additional measuring device, such as a power meter. This contributes to reducing the size and cost of the gas laser apparatus. More specifically, according to the present invention, the laser power supply input power calculation unit 11, driving device input power calculation unit 12, and power consumption calculation unit 13 are provided as operational processing means for performing calculations using the detected output current and output voltage values, eliminating the need for a power meter.

In the above-described embodiment of the present invention, the laser power supply input power calculation unit 11, driving device input power calculation unit 12, and power consumption calculation unit 13 are provided within the control apparatus 3 which controls the overall operation of the gas laser apparatus proper 2, but these units may be provided within an independent operational processing apparatus that is separate from the gas laser apparatus 1. For example, a program for implementing the functions of the laser power supply input power calculation unit 11, driving device input power calculation unit 12, and power consumption calculation unit 13, respectively, may be installed on an external computer, and the data of the output current and output voltage values detected by the current detection units 29 and 30 may be loaded into the external computer to calculate the power consumption of the gas laser apparatus 1.

The present invention can be applied to any gas laser apparatus that includes: a laser power supply device having a DC power supply unit for converting input AC power into DC power and an RF power supply unit for converting the DC power, output from the DC power supply unit, into a radio-frequency voltage which is applied to produce an electric discharge for exciting a laser gas contained in a discharge tube; and a driving device which converts input AC power into AC power for driving a blower to supply the laser gas into the discharge tube.

According to the present invention, in a gas laser apparatus includes a laser power supply device having a DC power supply unit for converting input AC power into DC power and an RF power supply unit for converting the DC power, output from the DC power supply unit, into a radio-frequency voltage which is applied to produce an electric discharge for exciting a laser gas contained in a discharge tube, and a driving device which converts input AC power into AC power for driving a blower for supplying the laser gas into the discharge tube, it is possible to measure its power consumption in operation accurately and easily. Generally, the DC power supply unit and the laser power supply device contained in the gas laser apparatus are already provided with an output current detection circuit and output voltage detection circuit for laser control; according to the present invention, since the power consumption of the gas laser apparatus is calculated using the output current and output voltage values detected by these existing output current detection circuit and output voltage detection circuit, there is no need to provide any additional measuring device, such as a power meter for measuring the power consumption, and reductions in the size and cost of the gas laser apparatus can thus be achieved. That is, according to the present invention, rather than providing a power meter, operational processing means for performing calculations using the detected output current and output voltage values need only be provided and, since such operational processing means can be provided, for example, within the control apparatus that controls the overall operation of the gas laser apparatus, not only the cost but also the overall size of the apparatus can be reduced.

Further, according to the present invention, when the laser gas inside the discharge tube is discharge-excited, the DC power supply conversion efficiency is set to a value calculated in accordance with a logarithmic function whose variable is the output power value calculated by multiplying together the output current value and output voltage value of the DC power supply unit, and when the laser gas inside the discharge tube is not discharge-excited, it is set to a given constant value. Since the estimate of the input power to the laser power supply device is then calculated using a value obtained by dividing the output power value of the DC power supply unit by the DC power supply conversion efficiency thus set according to whether the laser gas is discharge-excited or not, the power consumption can be calculated accurately according to the operating state of the gas laser apparatus. As previously described, the discharge load impedance of the discharge tube varies widely depending on the magnitude of the output of the gas laser apparatus, but in the present invention, since the DC power supply conversion efficiency used for the calculation differs depending on whether the laser gas inside the discharge tube is discharge-excited or not, the power consumption of the gas laser apparatus can be calculated with good accuracy.

Furthermore, according to the present invention, when the blower is in the acceleration or constant-speed operation mode, the estimate of the input power to the driving device is calculated by dividing the value of the input power to the blower by the driving device conversion efficiency, i.e., the input-power-to-output-power conversion efficiency of the driving device, where the value of the input power to the blower is calculated in accordance with a quadratic function whose variable is the output current value of the driving device; accordingly, the power consumption of the gas laser apparatus can be calculated with good accuracy, irrespective of variations in discharge load.

Further, according to the present invention, when the blower is in the deceleration mode, the estimate of the input power to the driving device is calculated in accordance with a cubic function whose variable is the time elapsed from the initiation of deceleration of the blower; accordingly, the power consumption of the gas laser apparatus can be calculated with good accuracy without being affected by the regenerative power that occurs during deceleration of the blower.

Furthermore, according to the present invention, since the power consumption value of the gas laser apparatus is calculated by adding the premeasured power consumption value of the laser gas exhaust pump provided in the gas laser apparatus to the sum of the estimate of the input power to the laser power supply device and the estimate of the input power to the driving device, there is no need to provide an additional circuit for detecting the current and voltage for driving the exhaust pump, and as a result, the power consumption of the gas laser apparatus can be calculated with higher accuracy, while achieving reductions in the size and cost of the gas laser apparatus.

For example, according to the techniques disclosed in the earlier cited Japanese Unexamined Patent Publication Nos. 2011-028372 and 2010-074918, a power meter has had to be provided separately by installing a current transformer (CT) or the like on a cable through which power is supplied to the gas laser apparatus. By contrast, according to the present invention, since the power consumption of the gas laser apparatus is calculated by using the output current and output voltage values detected by the output current detection circuit and output voltage detection circuit already provided in the gas laser apparatus, there is no need to provide an additional measuring device such as a power meter, and hence, reductions in the size and cost of the gas laser apparatus can be achieved.

On the other hand, if the technique disclosed in the earlier cited Japanese Unexamined Patent Publication No. 2010-115063 is to be applied to calculate the power consumption of the gas laser apparatus, it may be possible to calculate the power consumption of the blower motor by suitably combining the motor current detection unit and the motor rotational speed detection unit, but when it comes to measuring the power consumption of the gas laser apparatus, it has been difficult to accurately measure it because the discharge load impedance of the discharge tube varies widely depending on the magnitude of the output of the gas laser apparatus. In contrast, according to the present invention, since the equation used to calculate the power consumption associated with the laser light generation differs depending on whether the laser gas inside the discharge tube is discharge-excited or not, and since the equation used to calculate the power consumption associated with the driving of the blower differs depending on the control state of the blower, the power consumption of the gas laser apparatus can be calculated with good accuracy.

The technique disclosed in earlier cited Japanese Unexamined Patent Publication No. 2011-048548, on the other hand, has required detailed data of the output power versus conversion efficiency characteristics in order to accurately calculate the power consumption and has therefore required enormous storage capacity for storing the data. In contrast, according to the present invention, since the approximation equation used to calculate the power consumption associated with the laser light generation differs depending on whether the laser gas inside the discharge tube is discharge-excited or not, and since the approximation equation used to calculate the power consumption associated with the driving of the blower differs depending on the control state of the blower, i.e., since the power consumption of the gas laser apparatus is calculated by using approximation equations that differ according to the operating state of the gas laser apparatus, enormous storage capacity is not necessary, and the time required for computations can also be reduced.

The invention claimed is:

1. A gas laser apparatus comprising: a laser power supply device having a DC power supply unit for converting input AC power into DC power and an RF power supply unit for converting the DC power, output from the DC power supply unit, into a radio-frequency voltage which is applied to produce an electric discharge for exciting a laser gas contained in a discharge tube; and a driving device which converts input AC power into AC power for driving a blower to supply the laser gas into the discharge tube, wherein the gas laser apparatus includes:

a first estimation unit which calculates an estimate of input power to the laser power supply device by using an output current value and an output voltage value detected from the DC power supply unit and also using a DC power supply conversion efficiency which represents the efficiency of conversion from input power to output power by the DC power supply unit;

a second estimation unit which calculates an estimate of input power to the driving device by using an output current value detected from the driving device; and a power calculation unit which calculates a power consumption value of the gas laser apparatus, based on the estimate of the input power to the laser power supply device and the estimate of the input power to the driving device, wherein when the blower is in a deceleration operation mode, the second estimation unit calculates the estimate of the input power to the driving device in accordance with a cubic function whose variable is the time elapsed from the initiation of deceleration of the blower.

2. The gas laser apparatus according to claim 1, wherein the first estimation unit calculates the estimate of the input power to the laser power supply device by setting the DC power supply conversion efficiency to a value calculated in accordance with a logarithmic function whose variable is an output power value calculated by multiplying together the output current value and the output voltage value of the DC power supply unit, when the laser gas inside the discharge tube is discharge-excited, and at a given constant value when the laser gas inside the discharge tube is not discharge-excited.

3. The gas laser apparatus according to claim 2, wherein the first estimation unit calculates the estimate of the input power to the laser power supply device, based on a value obtained by dividing the output power value of the DC power supply unit by the DC power supply conversion efficiency and on a standby power value of the laser power supply device.

4. The gas laser apparatus according to claim 1, wherein the first estimation unit calculates the estimate of the input power to the laser power supply device, based on a value obtained by dividing the output power value of the DC power supply unit by the DC power supply conversion efficiency and on a standby power value of the laser power supply device.

5. The gas laser apparatus according to claim 1, wherein when the blower is in an acceleration operation or constant-speed operation mode, the second estimation unit calculates the estimate of the input power to the driving device by dividing the value of input power to the blower by a driving device conversion efficiency which represents the efficiency of conversion from input power to output power by the driving device, wherein the value of the input power to the blower is calculated in accordance with a quadratic function whose variable is the output current value of the driving device.

6. The gas laser apparatus according to claim 1, wherein the power calculation unit calculates the power consumption value of the gas laser apparatus, based on a premeasured power consumption value of a laser gas exhaust pump provided in the gas laser apparatus and on the estimate of the input power to the laser power supply device and the estimate of the input power to the driving device.

* * * * *